United States Patent
Knaggs

(10) Patent No.: US 10,107,982 B2
(45) Date of Patent: Oct. 23, 2018

(54) OPTICAL FIBER WEIGHT TRACKING SYSTEM

(71) Applicant: Telect, Inc., Liberty Lake, WA (US)

(72) Inventor: David Knaggs, Spokane, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/787,606

(22) Filed: Oct. 18, 2017

(65) Prior Publication Data

US 2018/0143392 A1 May 24, 2018

Related U.S. Application Data

(63) Continuation of application No. 15/357,744, filed on Nov. 21, 2016, now Pat. No. 9,835,815.

(51) Int. Cl.
| | |
|---|---|
| *G02B 6/00* | (2006.01) |
| *G02B 6/44* | (2006.01) |
| *G01G 19/52* | (2006.01) |
| *G02B 6/46* | (2006.01) |

(52) U.S. Cl.
CPC ........... *G02B 6/4459* (2013.01); *G01G 19/52* (2013.01); *G02B 6/447* (2013.01); *G02B 6/46* (2013.01)

(58) Field of Classification Search
CPC .................................................. G02B 6/4459
See application file for complete search history.

(56) References Cited

U.S. PATENT DOCUMENTS

| | | | |
|---|---|---|---|
| 5,842,554 A | 12/1998 | Stoxen et al. | |
| 6,808,116 B1 | 10/2004 | Eslambolchi et al. | |
| 7,742,675 B2 | 6/2010 | Sayres et al. | |
| 7,920,764 B2 * | 4/2011 | Kewitsch | G02B 6/447 340/572.7 |
| 8,322,871 B1 | 12/2012 | Knaggs et al. | |
| 8,451,981 B2 * | 5/2013 | Knight | H04M 3/2245 340/3.1 |
| 8,554,033 B2 * | 10/2013 | Kewitsch | G02B 6/3895 340/505 |
| 8,837,338 B2 * | 9/2014 | Knaggs | H04W 52/0203 370/311 |
| 8,924,540 B2 * | 12/2014 | Knaggs | H04L 67/36 709/201 |
| 9,213,160 B2 | 12/2015 | Hilbert | |
| 9,835,815 B1 * | 12/2017 | Knaggs | G02B 6/4459 |
| 2004/0184747 A1 | 9/2004 | Koyasu et al. | |
| 2008/0133047 A1 | 6/2008 | Best et al. | |

(Continued)

OTHER PUBLICATIONS

"Data Cable Tracer", CABAC, retreived at <<http://www.cabac.com.au/products/electrical-test-and-measurement/cable-locators-and-markers/C183>> on Nov. 15, 2016, 2 pages.

(Continued)

*Primary Examiner* — Rhonda Peace

(74) *Attorney, Agent, or Firm* — Lee & Hayes, PLLC

(57) ABSTRACT

An optical fiber cord management system and method is provided to monitor and manage optical fiber cords weights in telecommunication equipment. The system comprise a weight sensing member arranged with a trough member for converting a force applied to the trough member by an optical fiber cord. The system may include a processor, in communication with the weight sensing member. The processor may receive force signal data from the weight sensing member.

20 Claims, 10 Drawing Sheets

(56) References Cited

U.S. PATENT DOCUMENTS

| | | |
|---|---|---|
| 2008/0273844 A1 | 11/2008 | Kewitsch |
| 2009/0153321 A1 | 6/2009 | Lange et al. |
| 2010/0181119 A1 | 7/2010 | Saigh et al. |
| 2012/0294581 A1 | 11/2012 | Takisaki et al. |
| 2013/0076589 A1 | 3/2013 | Caveney |
| 2014/0141649 A1 | 5/2014 | Standish |
| 2014/0314122 A1 | 10/2014 | Knoop |
| 2015/0260935 A1 | 9/2015 | Williams |
| 2017/0150316 A1 | 5/2017 | George et al. |

OTHER PUBLICATIONS

Office Action for U.S. Appl. No. 15/357,744, dated Apr. 27, 2017, Knaggs, "Optical Fiber Weight Tracking System", 7 pages.
Office Action for U.S. Appl. No. 15/357,653, dated Sep. 29, 2017, Knaggs, "Optical Fiber Location Tracking System", 32 pages.
"TracerLight Connector Identification System", COMMSCOPE, www.commscope.com, Nov. 2015, 4 pages.

* cited by examiner

OPTICAL FIBER WEIGHT TRACKING SYSTEM

RELATED APPLICATIONS

This application claims priority to and is a continuation of U.S. patent application Ser. No. 15/357,744, filed on Nov. 21, 2016, the entire contents of which are incorporated herein by reference.

TECHNICAL FIELD

This application relates to systems and methods of managing optical fiber cord in a telecommunications network infrastructure.

BACKGROUND

Tracking systems for optical fiber cords exist that include a light source arranged at each end of the optical fiber cord. For example, each end of an optical fiber cord (e.g., fiber jumper cable) may include a light source that allows a technician to visually locate both illuminated ends of the optical fiber cord. However, this technology does not provide for tracing a path of the optical fiber cord contained in a trough member. Moreover, if the illuminated ends of the optical fiber cord are concealed, the illuminated ends are not able to be seen by a technician.

Tracking systems for optical fiber cords exist that include a light source arranged along a length of the optical fiber cord. For example, electroluminescent wire (EL wire) may extend along the length of the optical fiber cord that illuminates along the length thereof for allowing a technician to visually locate the optical fiber cord. However, this technology does not provide for tracing a path of the optical fiber cord contained in a trough member arranged overhead of a technician. Moreover, if the illuminated optical fiber cord is concealed, the illuminated optical fiber cord is not able to be seen by a technician.

As such, existing tracking systems for optical fiber cords do not provide for quickly and accurately identifying a path of an optical fiber cord. For example, a technician may desire to remove an optical fiber cord from telecommunication equipment located at the telecommunication site, but the optical fiber cord may be concealed in a trough member such that the technician is not able to see the illuminated portion of the optical fiber cord.

Furthermore, a telecommunication company's ability to add a new cord (e.g., new optical fiber cord, jumper cord, power cord etc.) to the telecommunication equipment located at the telecommunication site is also desired by telecommunication companies. For example, today's telecommunication companies may be capable of arranging an optical fiber cord in a trough member with bend radius protection, but the trough member is void of intelligence and is incapable of recommending a route for the optical fiber cord to be arranged in the telecommunication equipment located at the telecommunication site. Having the ability to recommend a route for a cord to be arranged in telecommunication equipment, would provide a telecommunication organization the ability to maximize the use of telecommunication equipment at a site (e.g., central office). More specifically, today's fiber trough systems do not provide data indicating location information of the optical fiber cords disposed with the fiber trough members, or data indicating loading information of the optical fiber cords disposed with the fiber trough members. In addition, a telecommunication organization may desire to monitor and manage optical fiber cords arranged in sites across an entire telecommunication network infrastructure.

Accordingly, there remains a need in the art for intelligent fiber trough systems including optical fiber cord location tracking systems and optical fiber cord weight tracking systems. Similarly, there remains a need in the art for a central server that is in communication with each intelligent fiber trough system arranged at each site across the entire telecommunication network infrastructure.

SUMMARY

This summary is provided to introduce simplified concepts for an optical fiber cord management system and method, which is further described below in the Detailed Description. This summary is not intended to identify essential features of the claimed subject matter, nor is it intended for use in determining the scope of the claimed subject matter.

An optical fiber cord management system and method is provided to monitor and manage optical fiber cords weights in telecommunication equipment (e.g., fiber trough members) arranged in sites (e.g., central office sites) across an entire telecommunication network infrastructure. In one example, a system comprises a weight sensing member arranged with a trough member for converting a force applied to the trough member by an optical fiber cord. The system may further include a processor, in communication with the weight sensing member. The processor may receive force signal data from the weight sensing member.

In some examples, the system may further comprise a jack providing a wired connection or an antenna providing a wireless connection. The jack or the antenna may be arranged with the processor, for communicating the force signal data to a central server. The central server may include memory storing a digital representation of an arrangement of the trough member relative to at least another trough member. The central server may associate the force signal data with a representative location in the digital representation of the arrangement of the trough member and the other trough member, corresponding to a location of the weight sensing member arranged with the trough member. The central server may create a map of a digital representation of a weight of the optical fiber cord arranged in the trough member based at least in part on the associating of the force signal data with the representative location in the digital representation of the arrangement of the trough members.

BRIEF DESCRIPTION OF THE DRAWINGS

The detailed description is described with reference to the accompanying figures. The use of the same reference numbers in different figures indicates similar or identical items.

DETAILED DESCRIPTION

Overview

Figure 1:
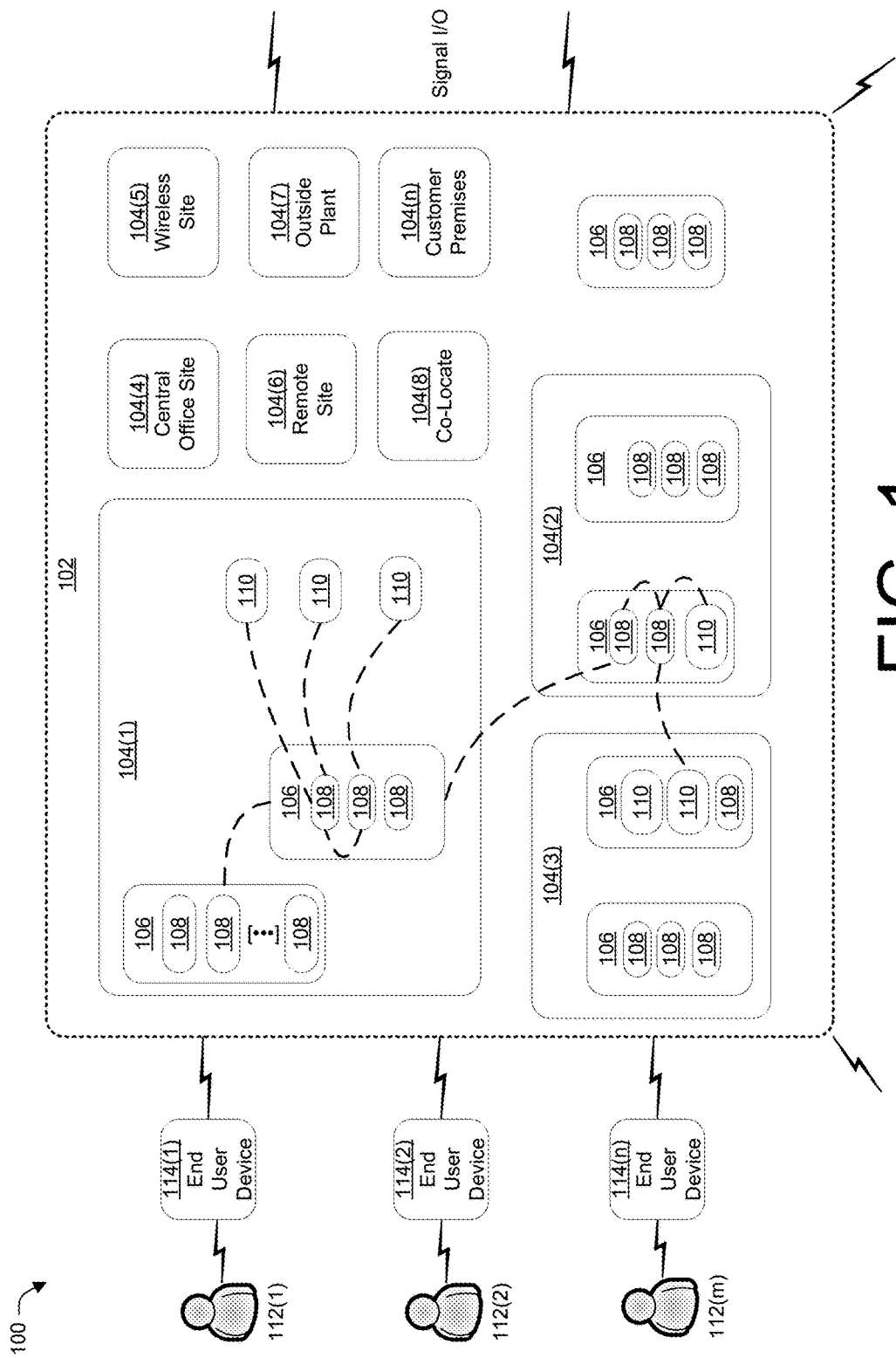
FIG. 1 illustrates an example environment for a telecommunications system including a central office site.

This disclosure is directed to an optical fiber location tracking system and method, an optical fiber weight tracking system and method, and an optical fiber management system and method. In some of the location tracking system implementations, an antenna may be configured to receive a radio signal propagated from an optical fiber cord disposed with a piece of equipment with which the antenna is identified. In some of the optical fiber weight tracking system implementations, a piezoelectric sensor may be arranged at a location between a first trough member and a second trough member for converting a force applied to the first trough member by one or more optical fiber cords arranged in at least the first trough member. In one of the optical fiber management system implementations, a server may receive reported radio signal data identified with telecommunication equipment located at a telecommunication site, and provide a graphical user interface (GUI) to allow a user to audit a map of paths of optical fiber cords relative to an arrangement of pieces of the telecommunication equipment located at the telecommunication site. In another one of the optical fiber management system implementations, a server may receive reported force signal data identified with a trough member located at a telecommunication site, and provide a GUI to allow a user to audit a map of a digital representation of relative weights of optical fiber cords located at the telecommunication site.

Traditional optical fiber cord tracking systems and methods have tracked optical fiber cords via light sources arranged on the optical fiber cords that allows for visually identifying an optical fiber cord. For example, a technician may simply illuminate an end of an optical fiber cord and visually locate the illuminated end. In other instances, meanwhile, a technician may illuminate a length of an optical fiber cord and visually locate the illuminated length. Because traditional tracking systems and methods simply illuminate an end or a length of an optical fiber cord, they are not capable of being visually located if the illuminated end or illuminated length of the optical fiber cord is concealed and, therefore, a path of the optical fiber cord may not be quickly and accurately traced with respect to a piece of equipment of a telecommunication site.

For example, traditional optical fiber cord tracking systems are not able to illuminate a path of an optical fiber cord to be quickly and accurately traced with respect to a trough member that is concealing the optical fiber cord. Further, traditional optical fiber cord tracking systems are not able to illuminate a path of an optical fiber cord to be quickly and accurately traced with respect to a portion of the optical fiber cord that is received by a fiber panel that is concealing the received portion optical fiber cord. Having the ability to trace optical fiber cord that is concealed may reduce costly unexpected removal of the wrong optical fiber cord. In addition, having the ability to trace optical fiber cord that is concealed will allow for reducing costly unintentional down-time of a telecommunication site's utilization.

Traditionally, a telecommunication company may add optical fiber cords to telecommunication equipment that provides bend radius protection for the optical fiber cords. Traditional telecommunication equipment does not have a processor in communication with a weight sensing member and, therefore, traditional telecommunication equipment is unable to recommend a route for the optical fiber cord to be arranged in the telecommunication equipment located at the telecommunication site.

For example, traditional trough members arranged in the telecommunication sites are not able to communicate force signal data to a central server that creates a map representing a digital representation of a recommended path for an optical fiber cord to be arranged in the trough members without overloading the trough members. Having the ability to recommend paths for optical fiber cords to be arranged in the trough members without overloading the trough members may increase a telecommunication site's space utilization. In addition, implementing a trough member system that has the ability to recommend paths for optical fiber cords to be arranged in the trough members may also reduce operating expenses for the telecommunication site.

Traditionally, telecommunication organizations do not employ a central server capable of managing optical fiber cord installation and/or removal at respective telecommunication sites across a telecommunications infrastructure network. Traditional telecommunication organizations also do not employ a central server connected with trough members arranged in telecommunication sites to provide a graphical user interface (GUI) configured to allow a user to easily view and audit a map representing a digital representation of a recommended path for an optical fiber cord to be arranged in trough members without overloading the trough members. Having the ability to provide a GUI configured to allow a user to audit maps representing digital representations of recommended paths for optical fiber cords to be arranged in trough members without overloading the trough members may increase a telecommunication site's space utilization. In addition, the ability to provide a GUI configured to allow a user to audit maps representing digital representations of recommended paths for optical fiber cords to be arranged in trough members without overloading the trough members may also reduce operating expenses for the telecommunication site.

Accordingly, this disclosure describes systems and methods for monitoring and managing optical fiber cords arranged in telecommunication sites across a telecommunications infrastructure network, which may result in a reduction of operating expenses for today's higher density optical fiber cord digital telecommunications network. To achieve these systems, in one example this application describes a telecommunication central office site having an optical fiber cable location tracking system configured to trace a path of an optical fiber cable disposed with a portion of telecommunication equipment arranged in the telecommunication central office site. In another example this application describes a telecommunication central office site having an optical fiber weight tracking system configured to determine a force applied to a trough member by the optical fiber cord arranged in the trough member arranged in the telecommunication central office site. In another example this application describes a management system having a central server communicatively coupled with the optical fiber cable location tracking system arranged at the telecommunication central office sites and/or communicatively coupled with the optical fiber weight tracking system arranged at the telecommunication central office sites.

The optical fiber cable location tracking system arranged in the telecommunication central office site has an antenna to receive a radio signal propagated from an optical fiber cord configured to be arranged with a piece of telecommunication equipment. The antenna may be disposed on a surface of the piece of telecommunication equipment. The antenna may further be communicatively coupled with a processor. The processor, which determines radio signal data associated with the radio signal propagated from the optical fiber cord, matches a modulated radio signal. The processor may be communicatively coupled with a luminescent member, and configured to illuminate the luminescent member, to indicate that at least a portion of the optical fiber cord is disposed with the portion of telecommunications equipment, based at least in part on a determination that the data associated with the radio signal matches the modulated radio signal. Thus, the antenna, processor, and luminescent member, quickly and accurately identify a path of an optical fiber cord disposed with each portion of telecommunication equipment arranged in the central office site, thereby reducing costly unexpected removal of the wrong optical fiber cord at the central office site and reducing costly unintentional down-time of the central office site's utilization. In some implementations, the telecommunication equipment is a trough member (e.g., fiber trough member). In another implementation, the telecommunication equipment is a fiber panel or fiber block.

Because these optical fiber cable location tracking systems arranged in telecommunication central office sites track locations of optical fiber cable disposed with portions of telecommunication equipment arranged in the central office site, more finely detailed data may be provided. This allows for mapping and identifying functionality. For example, because locations of optical fiber cable are traced with respect to pieces of telecommunication equipment, a central database (e.g., a central server) may create maps representing a digital representation of paths of the optical fiber cords relative to the pieces of telecommunication equipment. Specifically, a server may determine a path of an optical fiber cord relative to an arrangement of the pieces of telecommunication equipment located at the central office site and provide a Graphical User Interface (GUI) configured to allow a user to audit the map of the path of the optical fiber cord relative to the arrangement of the pieces of telecommunication equipment located at the central office site.

The optical fiber weight tracking system arranged in the telecommunication central office site has a weight sensing member arranged with a trough member. The weight sensing member is for converting a force applied to the trough member by one or more optical fiber cords arranged in the trough member. The weight sensing member may be arranged at a location between a first trough member and a second trough member. The weight sensing member may be communicatively coupled with a processor. The processor may receive force signal data from the weight sensing member. The processor may further be arranged with a jack providing a wired connection or an antenna providing a wireless connection. The wired connection or the wireless connection is for communicating the force signal data to a central server. The central server associates the received force signal data with a representative location in a digital representation of an arrangement of the trough members, corresponding to the location of the weight sensing member, to create a map representing a digital representation of a recommended path for an optical fiber cord to be arranged in the trough members without overloading the trough members. Thus, the weight sensing member, processor, and server, quickly and accurately identify recommended paths for optical fiber cords to be arranged in trough members arranged in the central office site, thereby increasing space utilization at the central office site. In some implementations the weight sensing member is a piezoelectric sensor.

Because these optical fiber weight tracking systems arranged in telecommunication central office sites track weights of optical fiber cables arranged in trough members arranged in the central office site, more finely detailed data is provided. This allows for mapping and identifying functionality. For example, because weights of optical fiber cables are tracked with respect to the trough members, a central database (e.g., a central server) may create maps representing a digital representation of paths of the optical fiber cords relative to the trough members. Specifically, a server may determine a recommended path for additional optical fiber cord to be arranged in the trough members without overloading the trough members and provide a Graphical User Interface (GUI) configured to allow a user to audit the map of the recommended path of the optical fiber cord relative to the arrangement of the trough members located at the central office site.

The management system integrates radio signal data and/or force signal data from across multiple telecommunication sites (e.g., central office sites). The management system has a central server that receives radio signal data and/or force signal data from processors located at telecommunication sites. The radio signal data includes reported radio signal data indicating that at least a portion of an optical fiber cord is disposed with a piece of telecommunication equipment. The force signal data may include reported force signal data indicating a force applied, by at least an optical fiber cord of the optical fiber cords, to a trough member. The central server may create and serve to a user device a graphical user interface (GUI) configured to allow a user to audit a map of paths of optical fiber cords relative to an arrangement of pieces of the telecommunication equipment located at a telecommunication site and audit a map of a digital representation of relative weights of optical fiber cords located at a telecommunication site. Thus, the server may have a database that stores aggregated data from across the multiple telecommunication sites useable with a GUI to perform audits. In some implementations, the server stores respective digital representations of an arrangement of trough members located at respective telecommunication sites. Each of the digital representations of an arrangement of trough members may be tailored to respective telecommunication sites.

Because these management systems integrate radio signal data and/or force signal data from each telecommunication site across a telecommunication infrastructure network and provides a GUI to audit the integrated data, a map of a path of optical fiber cord of each telecommunication site, as well as a map of a digital representation of relative weights of optical fiber cords of each telecommunication site may be audited. Thus, reducing costly unintentional down-time of a telecommunication site for a telecommunication organization.

Example Environment

FIG. 1 illustrates an example implementation of an environment 100 operable to provide a telecommunications network in which the apparatuses and procedures of the present disclosure may be employed. The environment 100 includes at least a portion of a telecommunication network infrastructure 102 (hereinafter "infrastructure"). Infrastructure 102 provides telecommunications processes, structures, equipment, and devices between end-user devices such as modems, phones, facsimile devices, and so on used by end-users outside of the infrastructure 102 to communicate via a telecommunications network. Within infrastructure 102, a variety of equipment, apparatuses, and devices are utilized in routing, processing, distributing signals, and distributing power. Telecommunications signals and data may be processed, switched, routed, tested, patched, managed, or distributed by various pieces of equipment in the infrastructure 102. Infrastructure 102 may include fiber, copper, and or other types of communication cabling and transmission media utilized in routing, processing, and distributing telecommunications signals.

A variety of sites 104(1)-104(n) within infrastructure 102 may maintain various equipment used in the infrastructure 102. Sites 104 may be locations within infrastructure 102 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, as shown, for example, by the connection denoted in FIG. 1 by a dashed line between site 104(1), 104(2), and 104(3). Naturally, numerous interconnections between a plurality of sites 104 may be made. The numerous interconnections between the plurality of sites may include a power distribution interconnection to each of the sites. As depicted in FIG. 1, infrastructure 102 may have numerous sites 104 which may be different physical locations within infrastructure 102 such as a central office site 104(4), a wireless site 104(5), a remote site 104(6), an outside plant site 104(7), a co-locate site 104(8), and any other site utilized by infrastructure 102.

Each site 104 may have one or more housings 106 having a one or more of components 108. A housing 106 may be configured in a variety of ways to maintain or hold a plurality of components 108 in infrastructure 102. For example, a housing 106 may be configured as a housing for a primary power distribution panel (e.g., a BDFB), a secondary power distribution panel (e.g., a fuse panel) a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108.

Housing 106 may be situated in a variety of locations, such as inside a building or placed outside. Housings 106, for example, may be configured to protect components 108 from environmental influences when inside or outside. In FIG. 1, for instance, depicts site 104(1) as having two housings (e.g., cabinets) 106, each having a plurality of components 108. Other housings 106 may be included throughout infrastructure 102 at sites 104 as shown, for example, by housings 106 depicted within site 104(2).

Components 108 are pieces of telecommunications equipment in infrastructure 102 that may be kept or maintained in a housing 106 (e.g. cabinet) within the infrastructure 102. Components, for example, may be cross-connect panels, modules, splitters, combiners, terminal blocks, chassis, backplanes, switches, digital radios, repeaters, and so forth. Components 108 may be those devices utilized for processing and distributing signals in infrastructure 102 and which may be maintained in a housing 106. Components 108 may be those devices for distributing, controlling, and monitoring power. For example, components may be primary power distribution panels, secondary power distribution panels, central monitor boards, central control boards, local switches, rectifiers, generators, main buses, LVD controllers, thermal controllers, battery systems, and so forth.

Network elements 110 are pieces of telecommunications equipment that may be implemented in a variety of ways. For example, network elements 110 may be configured as fiber optic equipment, switches, digital cross connect (DSX) systems, telecommunication panels, terminal blocks, digital radios, network office terminating equipment, and any other telecommunication equipment or devices employed in a telecommunications infrastructure 102. Network elements 110 may be found within a cabinet 106 as a component 108 of the cabinet.

The environment 100 depicts a plurality of end users 112(1)-112(M) which may be communicatively coupled, one to another, via a telecommunication network including infrastructure 102. End users 112 may refer to a variety of users, such as consumers, business users, internal users in a private network, and other types of users that use telecommunications signals or transmit and receive telecommunications signals via client devices. Additionally, for purposes of the following discussion clients 112(1)-112(M) may also refer to the client devices and software which are operable to transmit and receive telecommunications signals. Thus, clients 112(1)-112(M) may be implemented as users, software, and/or devices.

The interconnection of pieces of equipment (e.g. cabinets 106, components 108 and network elements 110, and so forth) provides signal pathways between equipment for signals input to and output from infrastructure 102. For example, end-users 112(1)-112(M) may send signals into the infrastructure 102 and receive signals output from the infrastructure using a variety of end user devices 114(1)-(N) (e.g., a telephone, mobile phone, or the like). End user 112(1), for instance, may communicate with end user 112(M) via end-user devices 114(1) and 114(N). Thus, signals sent to and from infrastructure by end-users 112 via an end user device 114 may be routed, directed, processed, and distributed in a variety of ways via the equipment and interconnections within infrastructure 102.

Example Optical Fiber Location Tracking System

Figure 2:
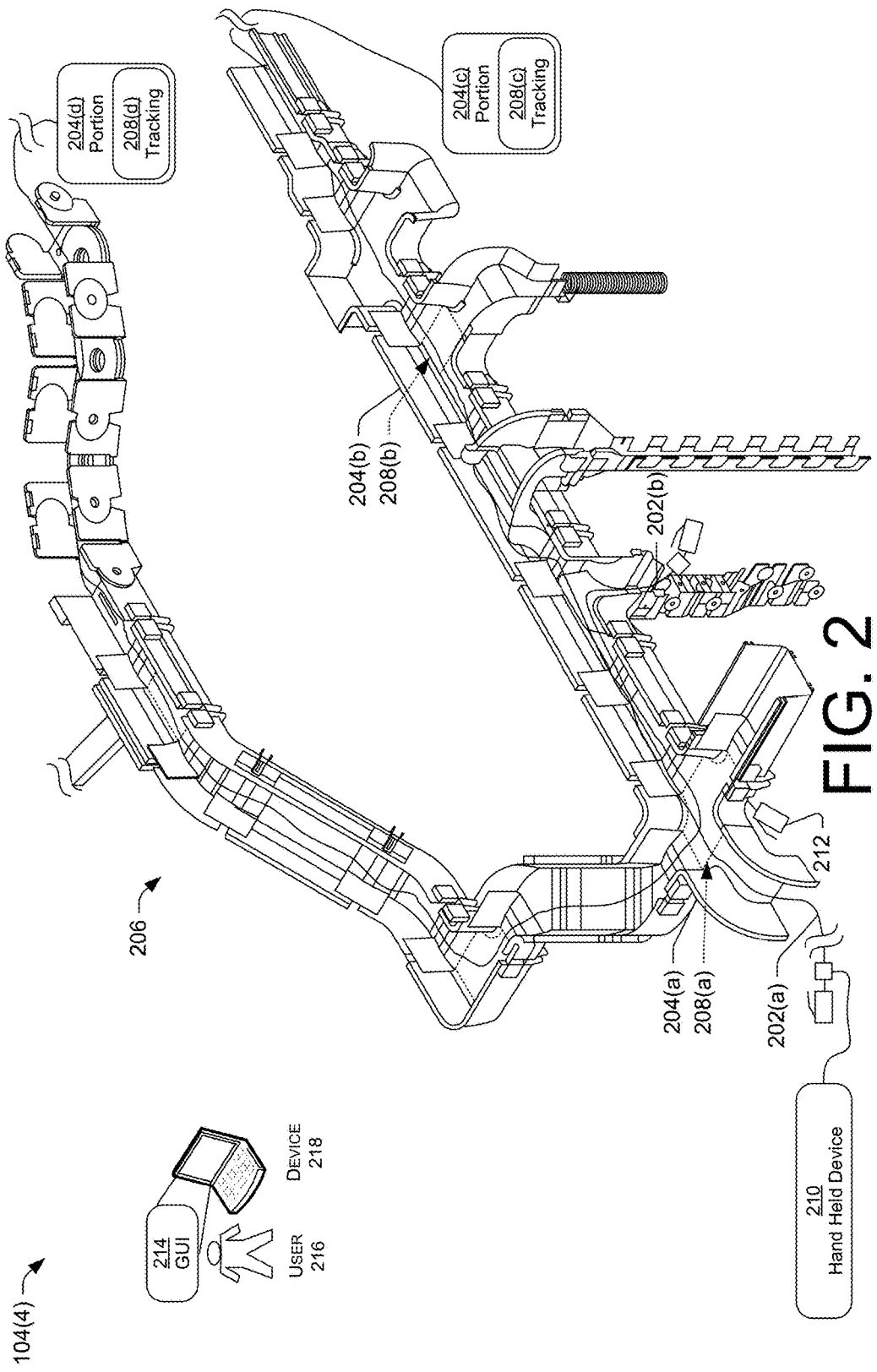
FIG. 2 illustrates an example implementation of an optical fiber location tracking system.

FIG. 2 illustrates an example implementation of a central office site 104(4) having an optical fiber location tracking system for use in the telecommunication network infrastructure 102. The optical fiber location tracking system arranged in the central office site 104(4) may track paths of optical fiber cord in the central office site 104(4).

The optical fiber location tracking system may comprise optical fiber cords 202(a) and 202(b) disposed with portions 204(a), 204(b), 204(c), and 204(d) of telecommunications equipment 206. The optical fiber cords 202(a) and 202(b) may include an optical fiber and at least one metal wire which allows electricity to complete a circuit with light sources at the ends of the optical fiber cords 202(a) and 202(b) or at least one electroluminescent wire arranged along a length of the optical fiber cords 202(a) and 202(b). (Discussed in more detail below with regard to FIG. 3). FIG. 2 illustrates the portions 204(a) and 204(b) of telecommunications equipment 206 are trough members (e.g., straight channels, junctions, transitions, couplers, elbows, ramps, reducers, flexible members, etc.) of a trough system, and portions 204(c) and 204(d) of telecommunications equipment 206 are fiber panels (e.g., patch panel, patch tray, splice panel, splice tray, etc.). In some examples, the portions 204(c) and 204(d) of telecommunications equipment 206 may be fiber blocks and/or patch blocks.

The optical fiber location tracking system may comprise optical fiber location tracking units 208(a), 208(b), 208(c), and 208(d) arranged with the portions 204(a), 204(b), 204(c), and 204(d) of the telecommunications equipment 206. For example, each of the tracking units 208(a) through 208(d) may include an antenna, a processor in communication with the antenna, and a luminescent member communicatively coupled with the processor. The antenna is for receiving a radio signal propagated from the optical fiber cord. For example, the antenna is for receiving a radio signal propagated from the metal wire or the electroluminescent wire arranged in the optical fiber cord. The processor is to receive radio signal data and determine whether the radio signal data matches a modulated radio signal.

FIG. 2 illustrates a hand held device 210 for applying the modulated radio signal to the optical fiber cords 202(a) or 202(b). For example, the hand held device 210 may apply a pulsed frequency and a voltage to the optical fiber cord 202(a) to produce the modulated radio signal in the optical fiber cord 202(a). For example, the hand held device 210 may apply the pulsed frequency and voltage to the metal wire or the electroluminescent wire arranged in the optical fiber cord 202(a). For example, the hand held device 210 may apply a frequency of at least about 2 kHz to at most about 5 kHz, and a voltage of at least about 3 v to at most about 120 v. In another example, a hand held device (not shown), different from the hand held device 210, may include an antenna and a processor to allow a technician to sense the optical fiber cord from a closer distance. The hand held device may have at least two sensitivity settings, a first setting that provides sensing at a moderate distance of a few feet from the optical fiber cord which would allow the technician to determine what fiber panel or block the optical fiber cord is entering, and a second setting that provides sensing at a very close distance of a few inches from the optical fiber cord which would allow the technician to determine which optical fiber cord is generating the modulated radio signal.

In this example, where the hand held device 210 applies the modulated radio signal to the optical fiber cord 202(a), the processors associated with tracking units 208(a) and 208(b) receive radio signal data and determine if the radio signal data matches the modulated radio signal. If the received radio signal data matches the modulated radio signal, the processors associated with tracking units 208(a) and 208(b) cause the luminescent members associated with tracking units 208(a) and 208(b) to illuminate. The illuminated luminescent members indicate that at least a portion of the optical fiber cord 202(a) is disposed with the portions 204(a) and 204(b) of the telecommunications equipment 206. For example, the illuminated luminescent members may indicate that at least a portion of the optical fiber cord 202(a) is arranged in a first trough member (e.g., a first junction trough member) and is also arranged in a second trough member (e.g., a second junction trough member). Because the illuminated luminescent members of each of the tracking units 208(a) and 208(b) are arranged with the portions 204(a) and 204(b) of the telecommunications equipment 206, a technician may quickly and accurately identify the path of an optical fiber cord 202(a). For example, the technician may quickly and accurately identify that the path of the optical fiber cord 202(a) traverses from the portion 204(a) of the telecommunications equipment 206 to the other portion 204(b) of the telecommunication equipment 206. Subsequent to identifying the path of the optical fiber cord 202(a), the user 216 (e.g., technician) may now remove the optical fiber cord 202(a) from service, as the user 216 knows the route and where to "mine" the optical fiber cord 202(a) out.

In some instances, and as shown in FIG. 2, the optical fiber location tracking system may comprise a jack 212 providing a wired connection for communicating the radio signal data to a computing device or a central server. For example, a jack 212 may be arranged with a processor of the tracking units 208(a) through 208(d) to communicate the radio signal data to a computing device or a central server. While FIG. 2 illustrates the tracking system comprising a jack 212 that provides a wired connection for communicating radio signal data, the tracking system may comprise an antenna for providing a wireless connection for communicating the radio signal data to a computing device or a central server. For example, an antenna may be arranged with a processor of the tracking units 208(a) through 208(d) to wirelessly communicate the radio signal data to a computing device or a central server. Further, the tracking units 208(a) through 208(d) may comprise an open wireless technology (e.g., Bluetooth™) for communicating the radio signal data to a computing device or a central server.

The computing device or central server, connected with tracking units 208(a), 208(b), 208(c), and 208(d), may provide a graphical user interface (GUI) 214 configured to allow a user 216, via a device 218, to easily view and audit a map representing a digital representation of the path of the optical fiber cord 202(a) arranged with the telecommunications equipment 206. For example, a central server may provide the GUI 214 to the user device 218 to allow the user 216 to easily view and audit the path of the optical fiber cord 202(a) traversing from the portion 204(a) of the telecommunications equipment 206 to the other portion 204(b) of the telecommunication equipment 206. Subsequent to auditing the path of the optical fiber cord 202(a), the user 216 (e.g., technician) may now remove the optical fiber cord 202(a) from service, as the user 216 knows the route and where to "mine" the optical fiber cord 202(a) out. Moreover, in addition to using the GUI 214 to audit the path, the user 216 may also utilize the illuminated luminescent members of each of the tracking units 208(a) and 208(b) arranged with the portions 204(a) and 204(b) of the telecommunications equipment 206 to quickly and easily "mine" the optical fiber cord 202(a) out of the portions 204(a) and 204(b) of the telecommunications equipment 206.

In an example where portions 204(c) and 204(d) of telecommunications equipment 206 are fiber panels (e.g., patch panel, patch tray, splice panel, splice tray, etc.) or blocks (e.g., fiber blocks and/or patch blocks), the tracking units 208(c) and 208(d) may be built into the fiber panels or blocks. In this example, where the portions 204(c) and 204(d) of telecommunications equipment 206 are fiber panels or blocks, the hand held device 210 applies the modulated radio signal to the optical fiber cord 202(a), and the processors associated with tracking unit 208(c) receive radio signal data and determine if the radio signal data matches the modulated radio signal. If the received radio signal data matches the modulated radio signal, the processor associated with tracking unit 208(c) causes the luminescent member associated with tracking unit 208(c) to illuminate. The illuminated luminescent member indicates that at least a portion of the optical fiber cord 202(a) is received by the portion 204(c) of the telecommunications equipment 206. For example, an antenna and processor of the tracking unit 208(c) could be built into a fiber panel which would sense when the optical fiber cord 202(a) is plugged into the fiber panel and has the presence or absence of the particular modulated radio signal. Because the illuminated luminescent member of the tracking unit 208(c) is arranged with the portion 204(c) of the telecommunications equipment 206, a technician may quickly and accurately identify the path of an optical fiber cord 202(a). Moreover, in addition to using the illuminated luminescent member of the tracking unit 208(c) that is arranged with the portion 204(c) of the telecommunications equipment 206 to quickly and accurately identify the path of the optical fiber cord 202(a), the user 216 may also utilize the GUI 214 to audit the path of the optical fiber cord 202(a).

While FIG. 2 illustrates four tracking units 208(a), 208(b), 208(c) and 208(d), arranged with the four portions 204(a), 204(b), 204(c), and 204(d) of the telecommunications equipment 206, any number of tracking units may be arranged with any number of portions of the telecommunications equipment. Further, while FIG. 2 illustrates two optical fiber cords 202(a) and 202(b) disposed with the telecommunication equipment 206, any number of optical fiber cords may be disposed with the telecommunication equipment 206. For example, up to about 2,000 optical fiber cords may be disposed with the telecommunication equipment.

Figure 3:
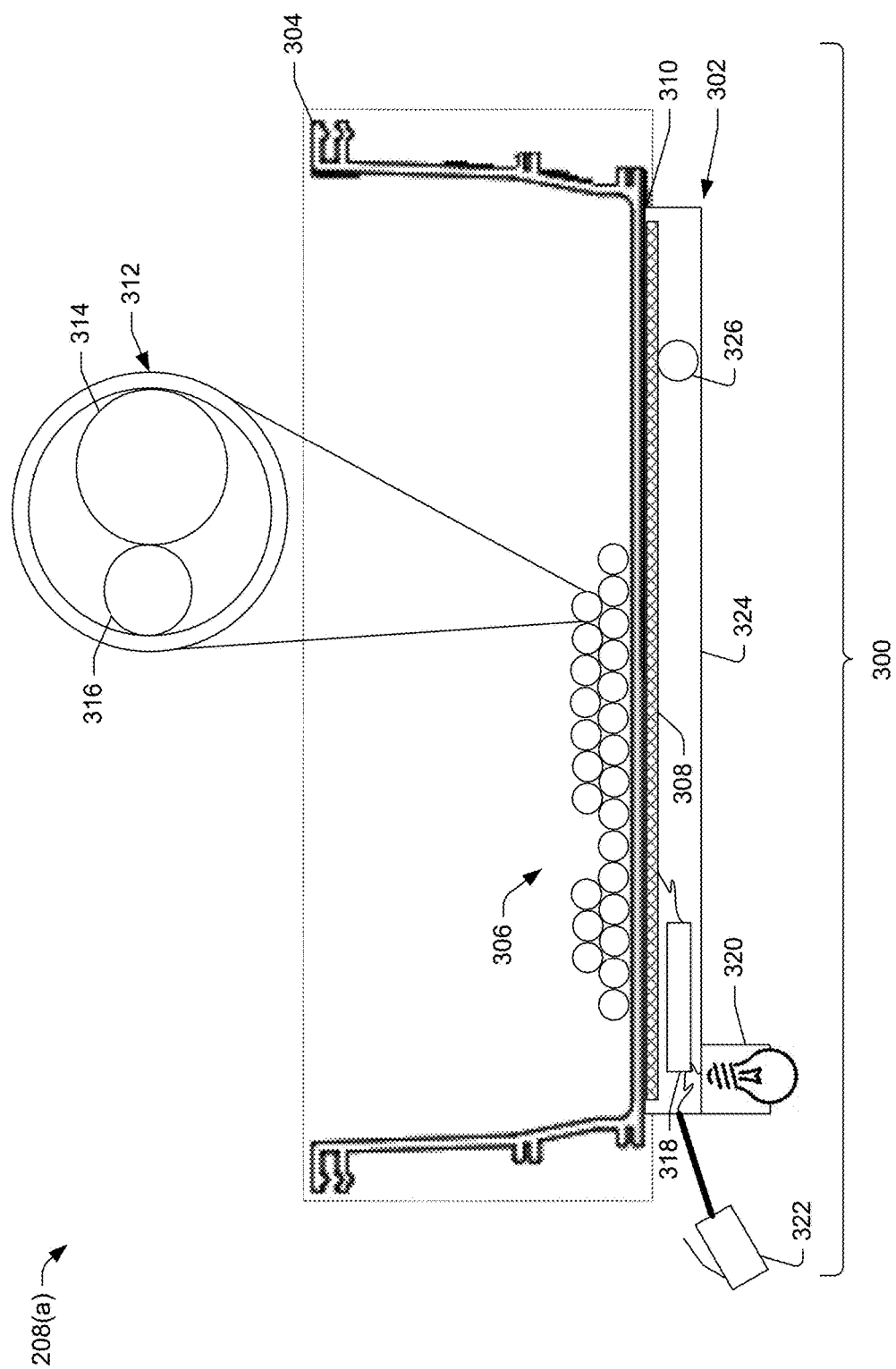
FIG. 3 illustrates a section view of an example optical fiber location tracking unit.

FIG. 3 illustrates a section view 300 of an example optical fiber location tracking unit 302 arranged with a portion 304 of telecommunications equipment. The example tracking unit 302 may be similar to any one of tracking units 208(a), 208(b), 208(c), and 208(d) discussed above with regard to FIG. 2. Moreover, the portion 304 of telecommunication equipment may be similar to any one of the portions 204(a), 204(b), 204(c), and 204(d) of the telecommunications equipment 206 discussed above with regard to FIG. 2.

FIG. 3 illustrates optical fiber cords 306 disposed with the portion 304 of telecommunications equipment and an antenna 308 disposed on a surface 310 of the portion 304 of telecommunications equipment. FIG. 3 illustrates that the antenna 308 may have a size that is about the same size as a size of the portion 304 of the telecommunications equipment. For example, the antenna 308 may have a size that is about the same size as a bottom width of a trough member. The antenna 308 is disposed on the portion 304 of the telecommunications equipment to receive a radio signal propagated from the optical fiber cord. For example, and as shown in detail view 312, the optical fiber cords 306 may include an optical fiber 314 and at least one signal carrying member 316, which may carry a modulated signal. In an example, the signal carrying member 316 may be at least one metal wire that is arranged to carry electricity to complete a circuit with light sources at the ends of the optical fiber cord. In another example, the signal carrying member 316 may be at least one electroluminescent wire that is arranged to be illuminated along a length of the optical fiber cord by a low frequency excitation at moderate to high voltage. In some examples, the hand held device 210, illustrated in FIG. 2, may apply the modulated signal to the signal carrying member 316 of the optical fiber cord 306.

FIG. 3 illustrates a processor 318 in communication with the antenna 308. The processor 318 receives radio signal data from the antenna 308 and determines if the radio signal data matches the modulated radio signal. The processor 318 may be a microprocessor or field-programmable gate array (FPGA) arranged to evaluate feedback from the antenna 308 and to determine if a modulated signal is present or is not present.

FIG. 3 illustrates a luminescent member 320, communicatively coupled with the processor 318. The luminescent member 320 may be disposed on the surface 310 of the portion 304 of telecommunications equipment, and the processor 318 illuminates the luminescent member 320, to indicate that at least a portion of the optical fiber cord 306 is disposed with the portion 304 of telecommunications equipment, based at least in part on determining that the radio signal data associated with the radio signal matches the modulated radio signal. In some examples, the luminescent member 320 is disposed on a bottom surface of an overhead trough member. In some examples, the luminescent member 320 is disposed on a front portion of a fiber panel or a fiber block. In some examples, the luminescent member 320 is a light emitting diode (LED).

In some instances, and as shown in FIG. 3, a jack 322 may be arranged with the processor 318 to communicate the radio signal data to a computing device or a central server. While FIG. 3 illustrates the jack 322 arranged with the processor 318 that provides a wired connection for communicating radio signal data, an antenna may be arranged with the processor 318 for providing a wireless connection for communicating the radio signal data to a computing device or a central server. Further, an open wireless technology (e.g., Bluetooth™) may be included with the processor 318 for communicating the radio signal data to a computing device or a central server.

FIG. 3 illustrates that at least the antenna 308 and the processor 318 may be housed together in a housing 324, and the housing 324 is disposed on the surface 310 of the portion 304 of telecommunications equipment. While FIG. 3 illustrates at least the antenna 308 and the processor 318 may be housed together in a housing 324 disposed on the surface 310 of the portion of telecommunication equipment, the antenna 308 and/or processor 318 may be housed separately. For example, the antenna 308 and/or processor 318 may be built into the portion 304 of telecommunications equipment. For example, the antenna 308 and/or processor 318 may be built into a trough member (e.g., junction, elbow, ramp, flexible member, etc.) of a trough system. While FIG. 3 illustrates the antenna 308 and the processor 318 may be powered by one or more batteries 326, the antenna 308 and the processor 318 may be hardwired to utility power.

Example Optical Fiber Weight Tracking System

Figure 4:
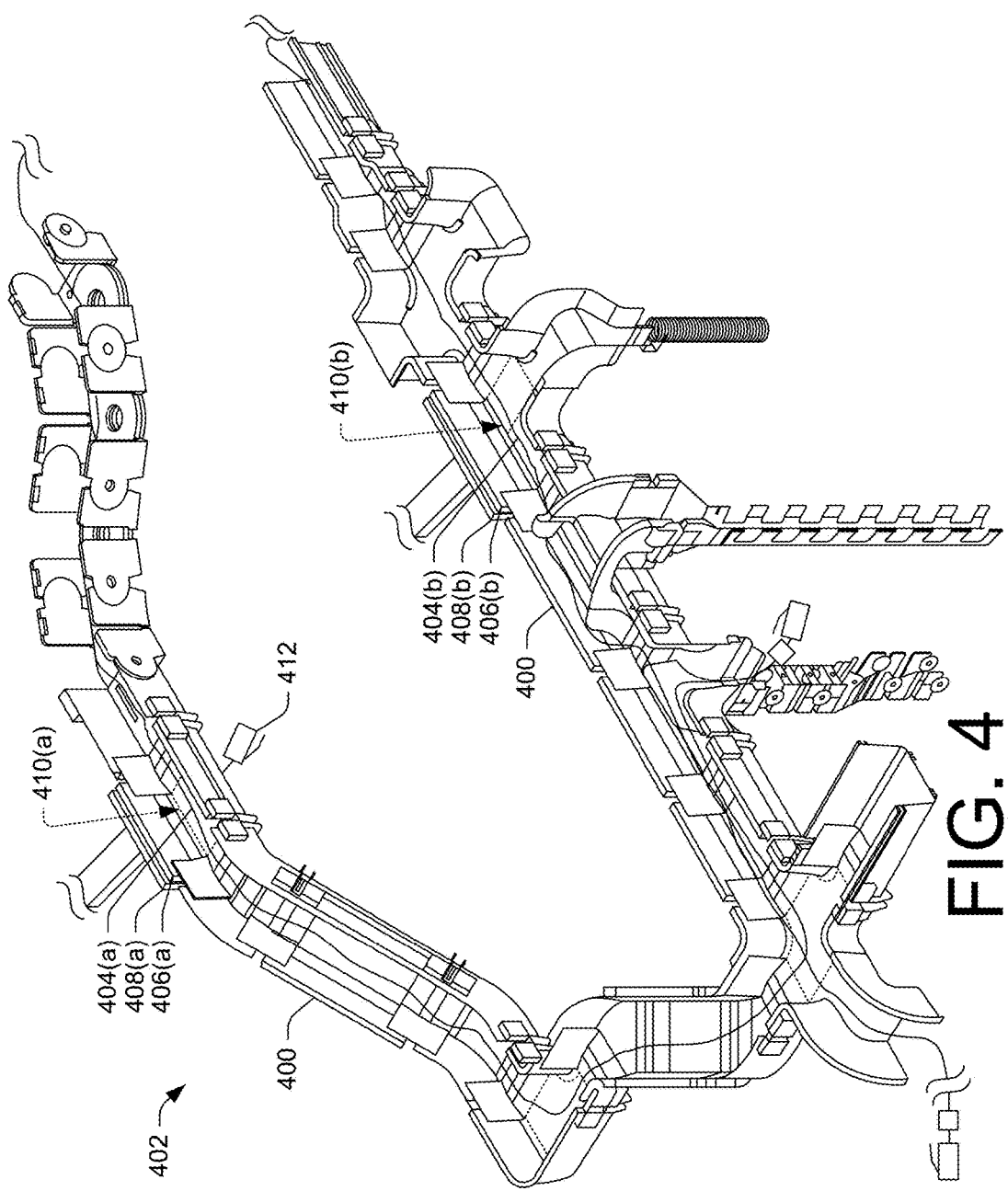
FIG. 4 illustrates an example implementation of an optical fiber weight tracking system.
Figure 4:
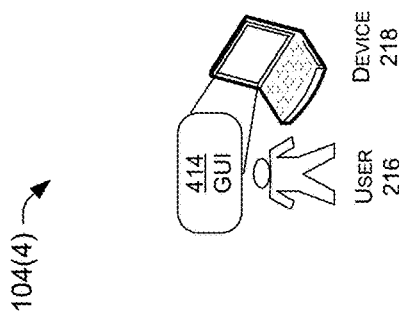

FIG. 4 illustrates an example implementation of a central office site 104(4) having an optical fiber weight tracking system for use in the telecommunication network infrastructure 102. The optical fiber weight tracking system arranged in the central office site 104(4) may track weights of optical fiber cord in the central office site 104(4).

The optical fiber weight tracking system may comprise an arrangement of trough members 400 forming a trough system 402. The trough system 402 may be at least a portion of the telecommunication equipment 206 of FIG. 2. The arrangement of the trough members 400 forming the trough system 402 may comprise conduit with bend radius protection which allows telecommunication companies to ensure that damage does not happen to optical fiber cords 404(a) and 404(b) arranged in the trough members 400. The optical fiber cords 404(a) and 404(b) may be the same as the optical fiber cords 202(a) and 202(b) illustrated in FIG. 2.

The arrangement of trough members 400 may comprise first trough members 406(a) and 406(b) being supported by at least second trough members 408(a) and 408(b). For example, the first trough members 406(a) and 406(b) may be straight channel members, junction members, transition members, coupler members, elbow members, ramp members, reducer members, flexible members, etc. supported by the second trough members 408(a) and 408(b). The second trough members 408(a) and 408(b) may be bracket members that support the first trough members 406(a) and 406(b). FIG. 4 illustrates that the optical fiber cord 404(a) may be arranged in at least the first trough member 406(a) and the optical fiber cord 404(b) may be arranged in at least the first trough member 406(b).

FIG. 4 illustrates that the optical fiber weight tracking system may comprise optical fiber cord weight tracking units 410(a) and 410(b) disposed with the first trough members 406(a) and 406(b) and second trough members 408(a) and 408(b). For example, each of the weight tracking units 410(a) and 410(b) may include a weight sensing member and a processor in communication with the weight sensing member. The weight sensing member is for converting a force applied to a trough member by an optical fiber cord. For example, the weight sensing member is for converting a force applied to the first trough member 406(a) by the optical fiber cord 404(a). The processor receives force signal data from the weight sensing member.

In some instances, and as shown in FIG. 4, the optical fiber weight tracking system may comprise a jack 412 providing a wired connection for communicating the force signal data to a computing device or a central server. For example, a jack 412 may be arranged with a processor of the weight tracking units 410(a) and 410(b) to communicate the force signal data to a computing device or a central server. While FIG. 4 illustrates the optical fiber weight tracking system comprising a jack 412 that provides a wired connection for communicating force signal data, the optical fiber weight tracking system may comprise an antenna for providing a wireless connection for communicating the force signal data to a computing device or a central server. For example, an antenna may be arranged with a processor of the weight tracking units 410(a) and 410(b) to wirelessly communicate the force signal data to a computing device or a central server. Further, the weight tracking units 410(a) and 410(b) may comprise an open wireless technology (e.g., Bluetooth™) for communicating the force signal data to a computing device or a central server.

The computing device or central server, connected with the weight tracking units 410(a) and 410(b), may provide a graphical user interface (GUI) 414 configured to allow the user 216, via the device 218, to easily view and audit a map of a digital representation of relative weights of optical fiber cords arranged in the first trough members 406(a) and 406(b). For example, a central server may provide the GUI 414 to the user device 218 to allow the user 216 to easily view and audit a map of a digital representation of relative weights of the optical fiber cords 404(a) and 404(b) arranged in first trough members 406(a) and 406(b). Subsequent to auditing the digital representation of relative weights of optical fiber cords arranged in the first trough members 406(a) and 406(b), the user 216 (e.g., technician) may now add an additional optical fiber cord into the first trough members 406(a) and 406(b), as the user 216 knows where to route the additional optical fiber cord without overloading the first trough members 406(a) and 406(b).

Moreover, the computing device or central server may create, using the relative weights, a second map representing a digital representation of volume percentages of optical fiber cords arranged in the first trough members 406(a) and 406(b). For example, the computing device or central server may create, using the relative weights of the optical fiber cords 404(a) and 404(b) arranged in the first trough members 406(a) and 406(b), a second map representing a digital representation of volume percentages of the optical fiber cords 404(a) and 404(b) arranged in the first trough members 406(a) and 406(b). The computing device or central server may provide the GUI 414 configured to allow the user 216, via the device 218, to easily view and audit the second map representing the digital representation of volume percentages of optical fiber cords arranged in the trough members. For example, a central server may provide the GUI 414 to the user device 218 to allow the user 216 to easily view and audit a second map representing a digital representation of volume percentages of the optical fiber cords 404(a) and 404(b) arranged in the first trough members 406(a) and 406(b). Subsequent to auditing the digital representation of volume percentages of optical fiber cords arranged in the first trough members 406(a) and 406(b), the user 216 (e.g., technician) may now add an additional optical fiber cord into the first trough members 406(a) and 406(b), as the user 216 knows where to route the additional optical fiber cord without overloading the first trough members 406(a) and 406(b).

Moreover, the computing device or central server may create, using the relative weights, a second map representing a digital representation of a recommended path for another additional optical fiber cord to be arranged in the trough members without overloading the trough members. For example, the computing device or central server may create, using the relative weights of the optical fiber cords 404(a) and 404(b) arranged in the first trough members 406(a) and 406(b), a second map representing a digital representation of a recommended path for an additional optical fiber cord to be arranged in the first trough member 406(a) or the other first trough member 406(b) without overloading the first trough members 406(a) and 406(b). The computing device or central server may provide the GUI 414 configured to allow the user 216, via the device 218, to easily view and audit the second map representing the digital representation of the recommended path for the additional optical fiber cord to be arranged in the trough members without overloading the trough members. For example, a central server may provide the GUI 414 to the user device 218 to allow the user 216 to easily view and audit a second map representing a digital representation of a recommended path for an additional optical fiber cord to be arranged in the first trough members 406(a) and 406(b) without overloading the first trough members 406(a) and 406(b). Subsequent to auditing the digital representation of the recommended path for the other additional optical fiber cord to be arranged in the trough members, the user 216 (e.g., technician) may now add, using the recommended path, an additional optical fiber cord into first trough member 406(a) or the second trough member 406(b) without overloading the first trough members 406(a) and 406(b). Moreover, the recommended path for the additional optical fiber cord may be based on a run length of the additional optical fiber cord. For example, the recommended path for the additional optical fiber cord may be based at least in part on a shortest distance between a first piece of telecommunication equipment (e.g., a first rack) and a second piece of telecommunication equipment (e.g., a second rack) and the relative weights of optical fiber cords arranged in the first trough members 406(a) and 406(b) arranged between the first and second pieces of telecommunication equipment.

While FIG. 4 illustrates two weight tracking units 410(a) and 410(b), disposed with the first trough members 406(a) and 406(b) and the second trough members 408(a) and 408(b), any number of weight tracking units may be arranged with any number of the first and second trough members. Further, while FIG. 4 illustrates two optical fiber cords 404(a) and 404(b) disposed in the first trough members 406(a) and 406(b), any number of optical fiber cords may be disposed in the first trough members 406(a) and 406(b).

Figure 5:
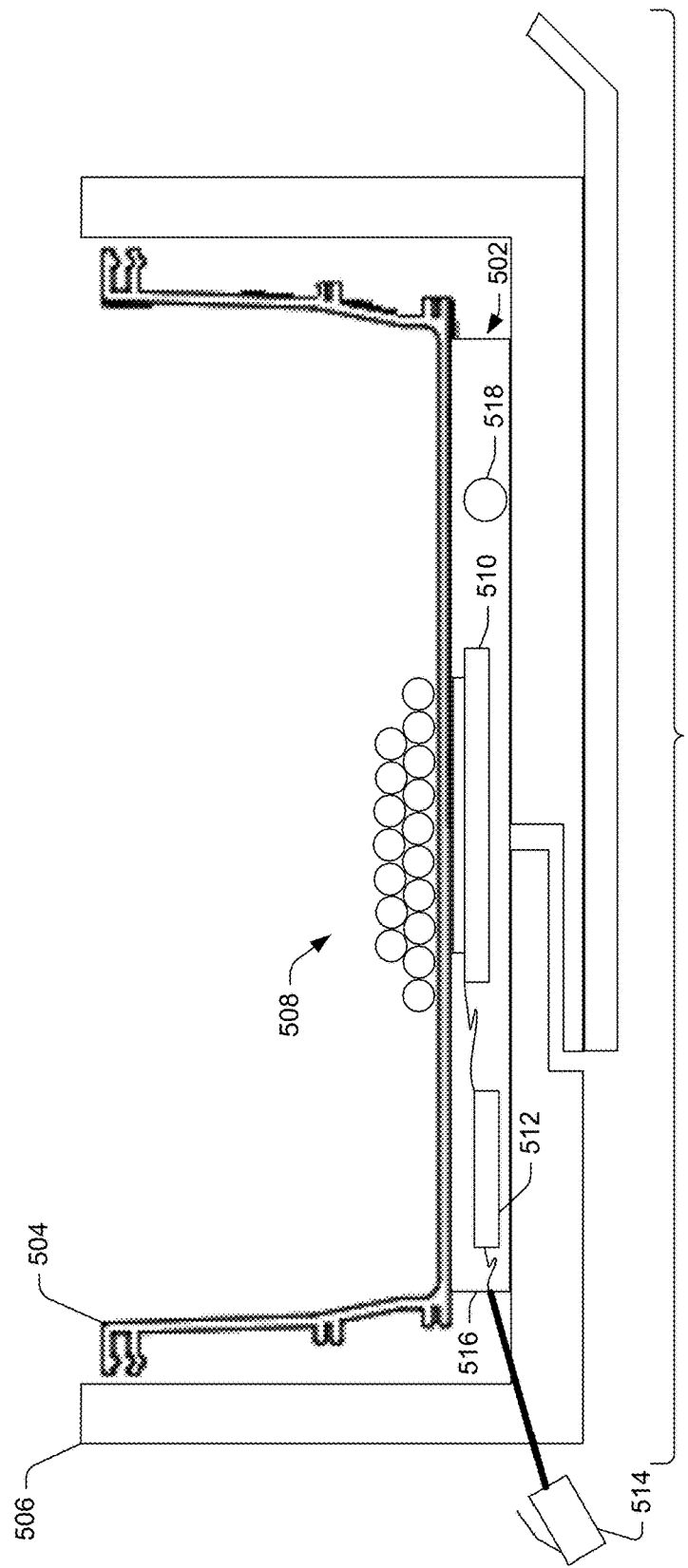
FIG. 5 illustrates a section view of an example optical fiber weight tracking unit.

FIG. 5 illustrates a section view 500 of an example optical fiber weight tracking unit 502 disposed with a first trough member 504 and second trough member 506. FIG. 5 illustrates the first trough member 504 being supported by the second trough member 506. The second trough member 506 may be fixed to a rack (e.g., overhead ladder rack). The example weight tracking unit 502 may be similar to the weight tracking units 410(a) and 410(b) discussed above with regard to FIG. 4. Moreover, the first trough member 504 and the second trough member 506 may be similar to the first trough members 406(a) and 406(b) and the second trough members 408(a) and 408(b) discussed above with regard to FIG. 4.

FIG. 5 illustrates optical fiber cords 508 arranged in the first trough member 504 and a weight sensing member 510 arranged at a location between the first trough member 504 and the second trough member 506. The weight sensing member 510 for converting a force applied to the first trough member 504 by the optical fiber cords 508. For example, the weight sensing member 510 may comprise a piezoelectric sensor arranged at the location between the first trough member 504 and the second trough member 506 for converting a force applied to the first trough member 504 by the optical fiber cords 508 arranged in the first trough member 504.

FIG. 5 further illustrates a processor 512, in communication with the weight sensing member 510 that receives force signal data from the weight sensing member 510. The processor 512 may be a microprocessor or field-programmable gate array (FPGA) arranged to receive force signal data from the weight sensing member 510.

In some instances, and as shown in FIG. 5, a jack 514 may be arranged with the processor 512 to communicate the force signal data to a computing device or a central server. While FIG. 5 illustrates the jack 514 arranged with the processor 512 that provides a wired connection for communicating force signal data, an antenna may be arranged with the processor 512 for providing a wireless connection for communicating the force signal data to a computing device or a central server. Further, an open wireless technology (e.g., Bluetooth™) may be arranged with the processor 512 for communicating the radio signal data to a computing device or a central server.

FIG. 5 illustrates that at least the weight sensing member 510 and the processor 512 may be housed together in a housing 516, and the housing 516 is arranged at a location between the first trough member 504 and the second trough member 506. While FIG. 5 illustrates that at least the weight sensing member 510 and the processor 512 may be housed together in a housing 516 arranged at a location between the first trough member 504 and the second trough member 506, the weight sensing member 510 and/or the processor 512 may be housed separately. For example, the weight sensing member 510 and/or the processor 512 may be built into the second trough member 506. In another example, the weight sensing member 510 and/or the processor 512 may be built into a bracket that supports a portion of a trough member. In yet another example, the weight sensing member 510 may be built into the first trough member, or built into both of the first and second trough members. While FIG. 5 illustrates the weight sensing member 510 and the processor 512 may be powered by one or more batteries 518, the weight sensing member 510 and the processor 512 may be hardwired to utility power.

Example Process of Tracking Optical Fiber Locations

Figure 6:
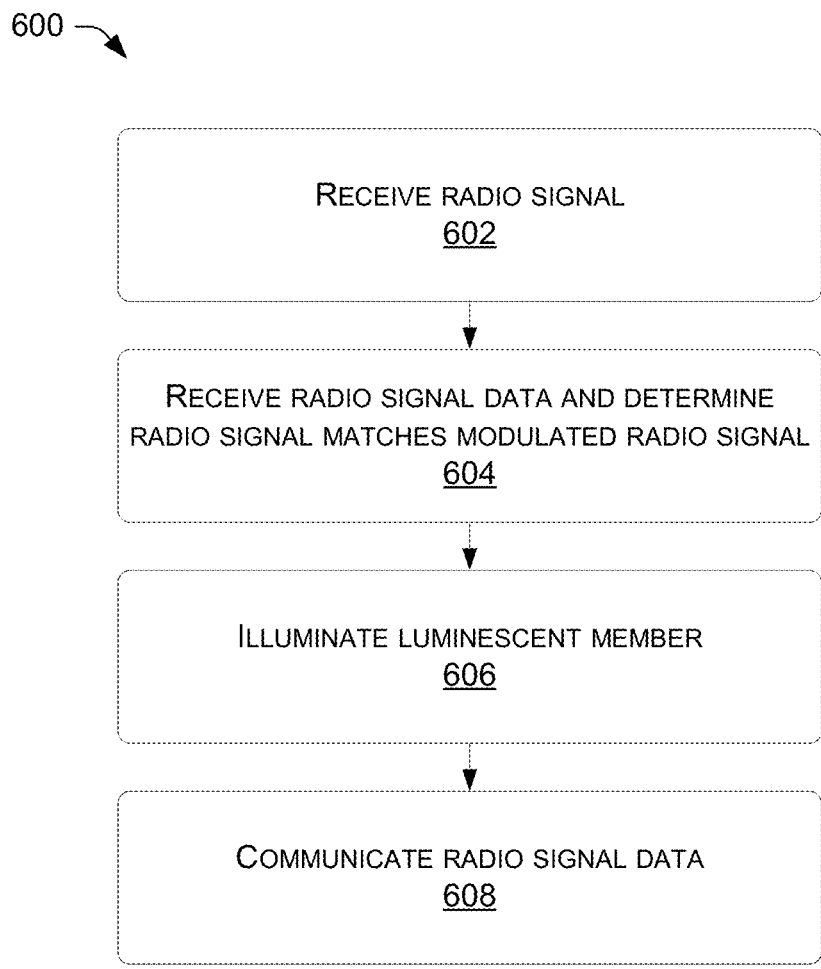
FIG. 6 is a flow diagram that illustrates an example process of tracking optical fiber locations.

FIG. 6 is a flow diagram that illustrates an example process 600 of tracking optical fiber locations at a central office site, such the central office site 104(4) illustrated in FIG. 2. While this figure illustrates an example order, it is to be appreciated that the described operations in this and all other processes described herein may be performed in other orders and/or in parallel in some instances. In the illustrated example, this process begins at operation 602, where an antenna (e.g., antenna 308) disposed on a surface (e.g., surface 310) of a portion (e.g., portion 304) of telecommunications equipment (e.g., telecommunications equipment 206) receives a radio signal propagated from optical fiber cord (e.g., optical fiber cord 202(a), 202(b), or 306).

Process 600 may include operation 604, which represents a processor (e.g., processor 318), in communication with the antenna, receiving radio signal data associated with the radio signal received by the antenna. Operation 604 may include the processor determining if the radio signal data matches a modulated radio signal. For example, the processor may determine if the radio signal data matches a modulated radio signal applied to an optical fiber cord by a hand held device (e.g., hand held device 210).

Process 600 may include operation 606, which represents the processor causing a luminescent member (e.g., luminescent member 320) to illuminate based at least in part on a determination that the radio signal data associated with the radio signal matches the modulated radio signal. The illuminated luminescent member indicates that at least a portion of the optical fiber cord is disposed with the portion of telecommunications equipment.

Process 600 may further include operation 608 in some instances, which represents communicating the radio signal data to a computing device or a central server. For example, the radio signal data may be communicated, via a wired connection or a wireless connection, to a central server. The computing device or the central server may integrate the communicated radio signal data from the central office site with a digital representation of an arrangement of the telecommunication equipment located at the central office site.

Example Process of Tracking Optical Fiber Weights

Figure 7:
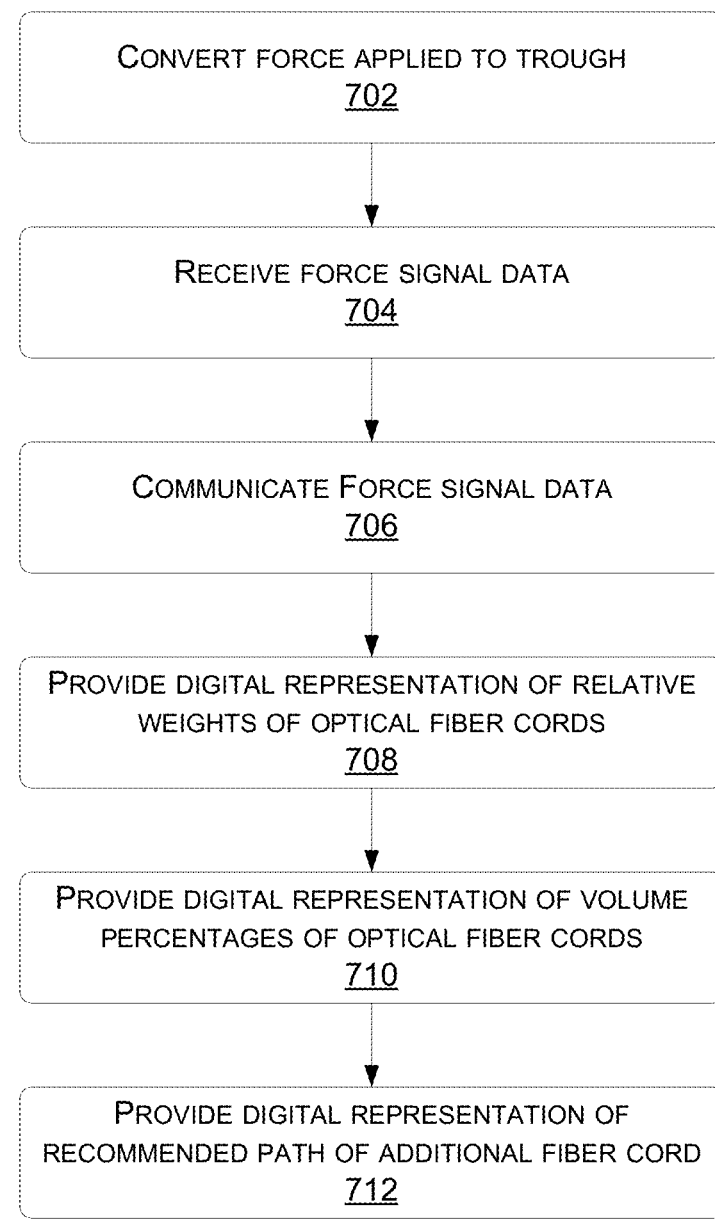
FIG. 7 is a flow diagram that illustrates an example process of tracking optical fiber weights.

FIG. 7 is a flow diagram that illustrates an example process 700 of tracking optical fiber weights at a central office site, such as the central office site 104(4) illustrated in FIG. 4. While this figure illustrates an example order, it is to be appreciated that the described operations in this and all other processes described herein may be performed in other orders and/or in parallel in some instances. In the illustrated example, this process begins at operation 702, where a weight sensing member (e.g., weight sensing member 510) arranged at a location between a first trough member (e.g., first trough member 504) and a second trough member (e.g., second trough member 506) converts a force applied to the first trough member by optical fiber cords (e.g., optical fiber cord 404(a), 404(b), or 508) arranged in the first trough member.

Process 700 may include operation 704, which represents a processor (e.g., processor 512), in communication with the weight sensing member, receiving force signal data from the weight sensing member.

Process 700 may include operation 706, which represents communicating the force signal data to a computing device or a central server. For example, the force signal data may be communicated, via a wired connection or a wireless connection, to a central server. The computing device or the central server may integrate the communicated force signal data from the central office site with a digital representation of an arrangement of trough members located at the central office site.

Process 700 may include operation 708, which represents the computing device or central server providing a graphical user interface (GUI) (e.g., graphical user interface (GUI) 414) configured to allow the user (e.g., user 216), via the device (e.g., device 218), to easily view and audit a map of a digital representation of relative weights of optical fiber cords arranged in the trough members located at the central office site.

Process 700 may include operation 710, which represents the computing device or central server creating, using the relative weights, a map representing a digital representation of volume percentages of optical fiber cords arranged in the trough members. Operation 710 may further include the computing device or central server providing a GUI configured to allow the user, via the device, to easily view and audit the second map representing the digital representation of volume percentages of optical fiber cords arranged in the trough members located at the central office site.

Process 700 may further include operation 712 in some instances, which represents the computing device or central server creating, using the relative weights, a map representing a digital representation of a recommended path for another additional optical fiber cord to be arranged in the trough members located at the central office site without overloading the trough members located at the central office site. Operation 712 may further include the computing device or central server providing a GUI configured to allow the user, via the device, to easily view and audit the second map representing the digital representation of the recommended path for the additional optical fiber cord to be arranged in the trough members without overloading the trough members.

Example Optical Fiber Management System

Figure 8:
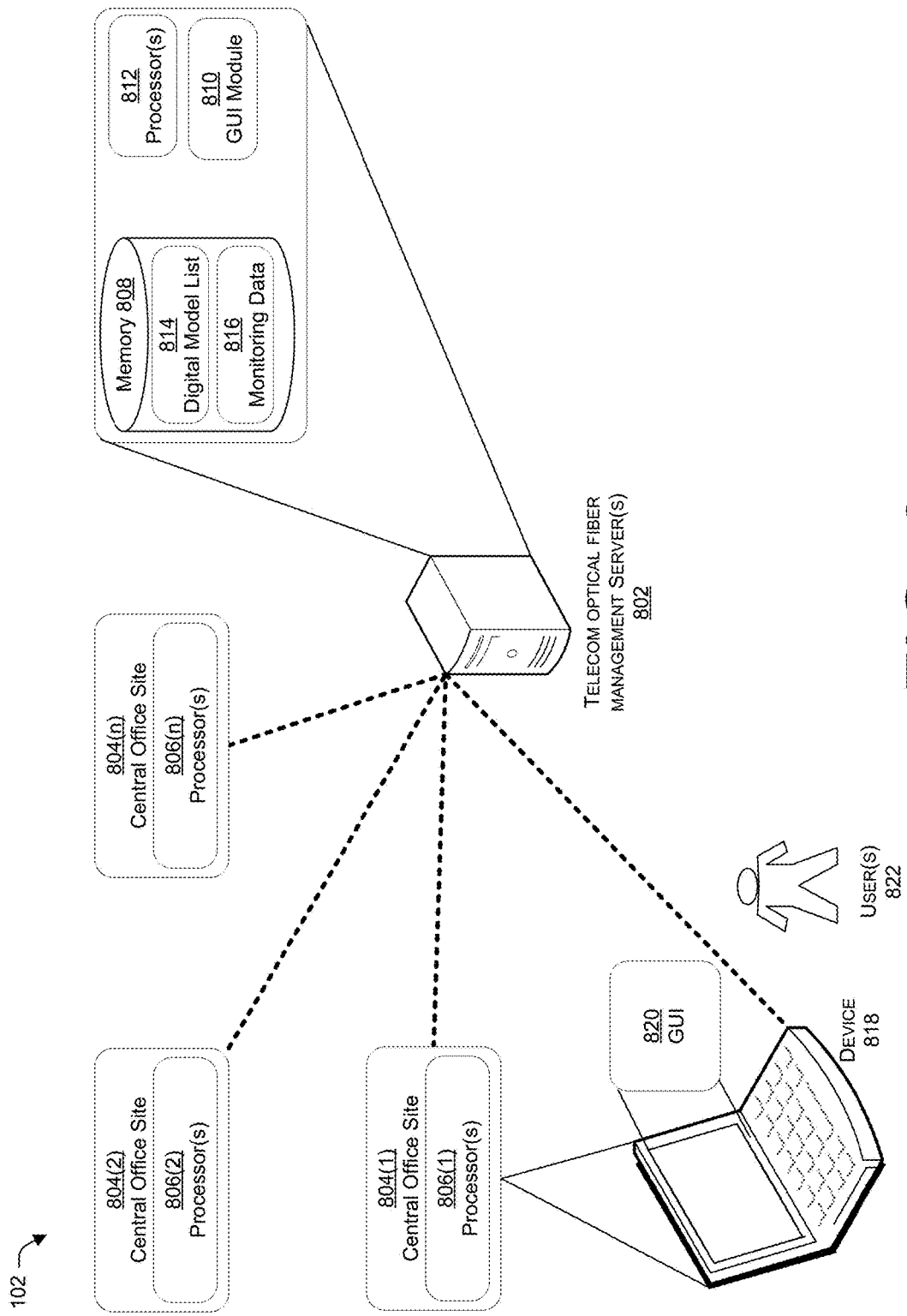
FIG. 8 illustrates an example implementation of a telecommunication network infrastructure having a telecommunication optical fiber management server.

FIG. 8 illustrates an example implementation of a telecommunication network infrastructure 102 having a telecommunication optical fiber management server 802. The telecommunication optical fiber management server 802 may be for managing optical fiber locations and/or optical fiber weights at central office sites 804(1), 804(2) and 804(n) across the entire telecommunication network infrastructure 102. FIG. 8 illustrates that the server 802 may be communicatively connected with a plurality of processors 806(1), 806(2), and 806(n). The processors 806(1), 806(2), and 806(n) may be located at respective central office sites 804(1), 804(2), and 804(n). While FIG. 8 illustrates the server 802 being communicatively connected with three processors, each located at a respective central office site, the server 802 may be communicatively connected with any number of processors located at respective central office sites. FIG. 8 illustrates further that the server 802 may comprise memory 808, a graphical user interface (GUI) module 810, and a processor(s) 812. The memory 808 may be configured to store instructions executable on the processor(s) 812, and may comprise a digital model list 814 and monitoring data 816.

The digital model list 814 may include a list of digital representations of arrangements of pieces of the telecommunication equipment located at the telecommunication sites. For example, the digital representations of arrangements of pieces of the telecommunication equipment located at the telecommunication sites may be digital models of the arrangements of the pieces of the telecommunication equipment located at each central office site 804(1), 804(2) and 804(n). For example, each digital model of each central office site 804(1), 804(2) and 804(n) may include a map of an as-built configuration of telecommunication equipment disposed at each central office site 804(1), 804(2) and 804(n). Each digital model of each central office site 804(1), 804(2) and 804(n) may include a map of an as-built configuration of trough members, fiber panels, fiber blocks, etc. located at a central office site.

The monitoring data 816 may include reported radio signal data and/or reported force signal data. In an example, the server 802 may receive reported radio signal data and/or reported force signal data from the processors 806(1), 806(2), and 806(n) located at respective central office sites 804(1), 804(2) and 804(n). In another example, the server 802 may receive reported radio signal data and/or reported force signal data from a central monitoring board disposed at each central office site 804(1), 804(2) and 804(n). Each central monitoring board may be configured to receive and send reported radio signal data and/or reported force signal data from each of the processors 806(1), 806(2), and 806(n) located at respective central office sites 804(1), 804(2) and 804(n). The central monitoring board may be coupled to a piece of telecommunication equipment arranged in the central office site. The central monitoring board may include a LAN port, a WAN port, and an onboard data storage. In addition, the server 802 may receive the radio signal data and/or force signal data from an onboard removable storage of each of the central boards. For example, each central board may comprise onboard removable storage storing the radio signal data and/or force signal data, each reported radio signal data and/or force signal data being identified with a respective one of the processors 806(1), 806(2), and 806(n) located at the central office sites 804(1), 804(2) and 804(n). The onboard removable storage may be removed from each central board and subsequently uploaded to the server 802. This could be done according to a schedule or during a servicing of equipment.

The server 802 may store the received reported radio signal data and/or reported force signal data in memory 808 as the monitoring data 816. The reported radio signal data may be identified with a fiber trough member located at one of the central office sites 804(1), 804(2) and 804(n). The reported radio signal data indicates that a portion of an optical fiber cord is disposed with the fiber trough member. The reported force signal data may be identified with a fiber trough member located at one of the central office sites 804(1), 804(2) and 804(n). The reported force signal data indicates a force applied, by an optical fiber cord, to the fiber trough member located at one of the central office sites 804(1), 804(2) and 804(n).

The server 802 may integrate the reported radio signal data and/or the reported force signal data. For example, the server 802 may integrate the reported radio signal data and/or the reported force signal data from a respective one of the central office sites 804(1), 804(2) and 804(n) with a digital representation of an arrangement of the telecommunication equipment located at the respective one of the central office sites 804(1), 804(2) and 804(n). For example, the server may integrate the reported radio signal data and/or the reported force signal data from central office site 804(1) with a digital representation of an arrangement of fiber trough members located at the central office site 804(1).

In one example, the server 802 may generate a map of a path of an optical fiber cord relative to an arrangement of the fiber trough members located at a respective one of the central office sites 804(1), 804(2) and 804(n). In another example, the server 802 may generate a map of a digital representation of relative weights of optical fiber cords arranged in the trough members located a respective one of the central office sites 804(1), 804(2) and 804(n).

FIG. 8 further illustrates the server 802 communicatively connected with a user device 818 displaying a GUI 820 to a user(s) 822. While FIG. 8 illustrates the user device 818 located at central office site 804(1), the user device 818 may be located at any one of the central office sites 804(1), 804(2) and 804(n). The memory 808 may store instructions that are executable on the processor(s) 812 to provide the GUI 820. In one example, where the user device 818 is located at central office site 804(1), the GUI 820 may be configured to allow a user to audit a map of a path of an optical fiber cord relative to an arrangement of fiber trough members located at the central office site 804(1). For example, server 802 may provide the GUI 820 to the user device 818 to allow the user 822 to easily view and audit a path of an optical fiber cord traversing from one trough member to another trough member located at the central office site 804(1). Subsequent to auditing the path of the optical fiber cord, the user may now remove the optical fiber cord from service, as the user knows the route and where to "mine" the optical fiber cord out.

In another example, where the user device 818 is located at the central office site 804(1), the GUI 820 may be configured to allow a user to audit a map of a digital representation of relative weights of optical fiber cords arranged in the fiber trough members located at the central office site 804(1). Subsequent to auditing the digital representation of relative weights of optical fiber cords arranged in the trough members, the user may now add an additional optical fiber cord into a trough member located at the central office site 804(1), as the user knows where to route the additional optical fiber cord without overloading the trough members located at the central office site 804(1).

In another example, where the user device 818 is located at the central office site 804(1), the GUI 820 may be configured to allow a user to audit a map representing a digital representation of volume percentages of optical fiber cords arranged in the trough members located at the central office site 804(1). For example, server 802 may create, using the relative weights, a map representing a digital representation of volume percentages of optical fiber cords arranged in the trough members located at the central office site 804(1). The GUI 820 is configured to allow the user, via the device, to easily view and audit the map representing the digital representation of volume percentages of optical fiber cords arranged in the trough members located at the central office site 804(1). Subsequent to auditing the digital representation of volume percentages of optical fiber cords arranged in the trough members located at the central office site 804(1), the user may now add an additional optical fiber cord into a trough member located at the central office site 804(1), as the user knows where to route the additional optical fiber cord without overloading the trough members located at the central office site 804(1).

In another example, where the user device 818 is located at the central office site 804(1), the GUI 820 may be configured to allow a user to audit a map representing a digital representation of a recommended path for an additional optical fiber cord to be arranged in the trough members located at the central office site 804(1). For example, server 802 may create, using the relative weights, a map representing a digital representation of a recommended path for an additional optical fiber cord to be arranged in the trough members located at the central office site 804(1) without overloading the trough members at the central office site 804(1). Subsequent to auditing the digital representation of the recommended path for the additional optical fiber cord to be arranged in the trough members at the central office site 804(1), the user may now add, using the recommended path, the additional optical fiber cord into the trough members at the central office site 804(1) without overloading the first trough members at the central office site 804(1). Moreover, the recommended path for the additional optical fiber cord may be based on a run length of the additional optical fiber cord. For example, the recommended path for the additional optical fiber cord may be based at least in part on a shortest distance between a first piece of telecommunication equipment (e.g., a first rack) and a second piece of telecommunication equipment (e.g., a second rack) and the relative weights of optical fiber cords arranged in the trough members arranged between the first and second pieces of telecommunication equipment.

Figure 9:
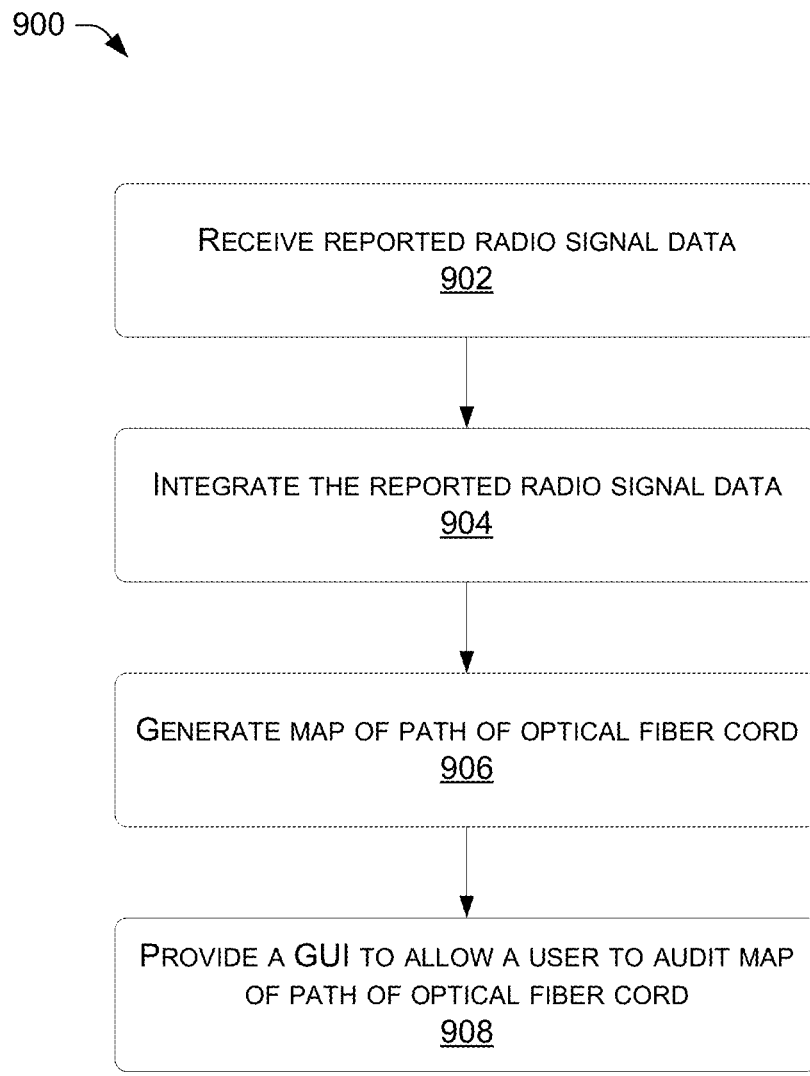
FIG. 9 is a flow diagram that illustrates an example process of managing optical fiber locations in a telecommunication network infrastructure using the telecommunication optical fiber management server of FIG. 8.

Example Processes of Managing Optical Fiber in a Telecommunication Network Infrastructure FIG. 9 is a flow diagram that illustrates an example process 900 of managing optical fiber locations in a telecommunication network infrastructure 102 using the telecommunication optical fiber management server 802 of FIG. 8. In some instances, this process begins at operation 902, where a server (e.g., server 802) may receive reported radio signal data from processor(s) (e.g., processor(s) 806(1), 806(2), or 806(n)). For example, the server may receive reported radio signal data from processor(s) 806(1) located at a central office site 804(1), processor(s) 806(2) located at a central office site 804(2), processor(s) 806(n) located at a central office site 804(n), or any other processor(s) located at any other telecommunication site. The reported radio signal data is identified with a piece of telecommunication equipment located at a central office site. The reported radio signal data indicates that at least a portion of an optical fiber cord is disposed with the piece of telecommunication equipment.

Process 900 may include, operation 904, which represents the server integrating the reported radio signal data from the central office site with a digital representation of an arrangement of pieces of the telecommunication equipment located at the central office site.

Process 900 may include operation 906, which represents the server generating a map of a path of the optical fiber cord relative to the arrangement of pieces of the telecommunication equipment located at the central office site.

Process 900 may further include operation 908 in some instances, which represents providing a GUI (e.g., GUI 214 or 820) configured to allow a user to audit the map of the path of the optical fiber cord relative to the arrangement of pieces of the telecommunication equipment located at the central office site. For example, the GUI may allow a user to audit the map of the path of the optical fiber cord relative to an arrangement of fiber trough members, fiber panels, fiber blocks, etc. located at the central office site.

Figure 10:
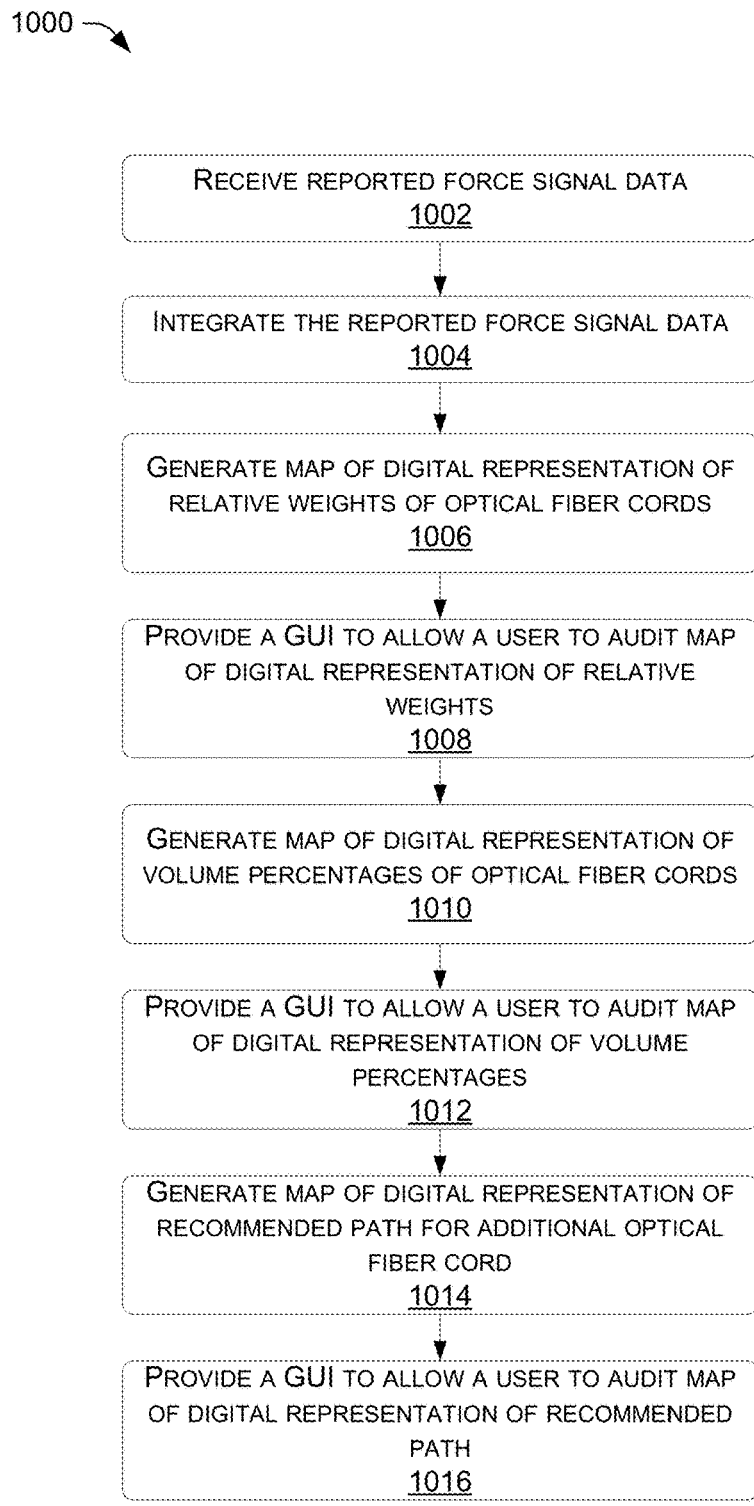
FIG. 10 is a flow diagram that illustrates an example process of managing optical fiber weights in a telecommunication network infrastructure using the telecommunication optical fiber management server of FIG. 8.

FIG. 10 is a flow diagram that illustrates an example process 1000 of managing optical fiber weights in a telecommunication network infrastructure 102 using the telecommunication optical fiber management server 802 of FIG. 8. In some instances, this process begins at operation 1002, where a server (e.g., server 802) may receive reported force signal data from processor(s) (e.g., processor(s) 806(1), 806(2), or 806(n)). For example, the server may receive reported force signal data from processor(s) 806(1) located at a central office site 804(1), processor(s) 806(2) located at a central office site 804(2), processor(s) 806(n) located at a central office site 804(n), or any other processor(s) located at any other telecommunication site. The reported force signal data is identified with a trough member located at a central office site. The reported force signal data indicates a force applied, by at least an optical fiber cord of optical fiber cords arranged in the central office site, to the trough member located at the central office site.

Process 1000 may include, operation 1004, which represents the server integrating the reported force signal data from the central office site with a digital representation of an arrangement of trough members located at the central office site.

Process 1000 may include operation 1006, which represents the server generating a map of a digital representation of relative weights of the optical fiber cords arranged in the trough members located at the central office site.

Process 1000 may include operation 1008, which represents the server providing a GUI (e.g., GUI 414 or 820) configured to allow a user to audit the map of the digital representation of relative weights of the optical fiber cords arranged in the trough members located at the central office site.

Process 1000 may include operation 1010, which represents the server generating a map representing a digital representation of volume percentages of optical fiber cords arranged in the trough members located at the central office site.

Process 1000 may include operation 1012, which represents the server providing a GUI (e.g., GUI 414 or 820) configured to allow a user to audit the map of the digital representation of volume percentages of optical fiber cords arranged in the trough members located at the central office site.

Process 1000 may include operation 1014, which represents the server generating a map representing a digital representation of a recommended path for an additional optical fiber cord to be arranged in the trough members located at the central office site without overloading the trough members at the central office site.

Process 1000 may further include operation 1016 in some instances, which represents the server providing a GUI (e.g., GUI 414 or 820) configured to allow a user to audit the map of the digital representation of the recommended path for the additional optical fiber cord to be arranged in the trough members located at the central office site without overloading the trough members at the central office site.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims. Moreover, while the illustrated embodiments show optical fiber location tracking systems being separated from optical fiber weight tracking systems, the optical fiber location tracking systems and optical fiber weight tracking systems may be combined. For example, an optical fiber location and weight tracking system may comprise antenna for receiving a radio signal propagated from an optical fiber cord, a weight sensing member for converting a force applied by the optical fiber cord, and one or more processors in communication with the antenna and the weight sensing member, to receive radio signal data from the antenna and force signal data from the weight sensing member.

What is claimed is:

1. A method of managing optical fiber cords in a telecommunication network infrastructure, the method comprising:
   receiving, by a server, reported radio signal data from a processor, wherein the reported radio signal data is identified with a first fiber trough member located at a telecommunication site of the telecommunication network infrastructure, the reported radio signal data indicating that a portion of a first optical fiber cord of the optical fiber cords is disposed with the first fiber trough member;
   receiving, by the server, reported force signal data from the processor, wherein the reported force signal data is identified with a second fiber trough member located at the telecommunication site, the reported force signal data indicating a force applied, by a second optical fiber cord of the optical fiber cords, to the second fiber trough member; and
   integrating, by the server, the reported radio signal data and the reported force signal data from the telecommunication site with a digital representation of an arrangement of the first and second fiber trough members located at the telecommunication site.

2. The method according to claim 1, further comprising generating, by the server, a map of a path of the first optical fiber cord relative to an arrangement of the first and second fiber trough members located at the telecommunication site.

3. The method according to claim 2, further comprising providing, by the server, a Graphical User Interface (GUI) configured to allow a user to audit the map of the path of the first optical fiber cord relative to the arrangement of the first and second fiber trough members located at the telecommunication site.

4. The method according to claim 1, further comprising generating, by the server, a map of a digital representation of relative weights of optical fiber cords arranged in the first and second fiber trough members located at the telecommunication site.

5. The method according to claim 4, further comprising providing, by the server, a Graphical User Interface (GUI) configured to allow a user to audit the map of the digital representation of relative weights of optical fiber cords arranged in the first and second fiber trough members located at the telecommunication site.

6. The method according to claim 4, wherein the map comprises a first map, and
   wherein the method further comprises generating, by the server, a second map representing a digital representation of volume percentages of optical fiber cords arranged in the first and second fiber trough members located at the telecommunication site.

7. The method according to claim 4, wherein the map comprises a first map, and
   wherein the method further comprises generating, by the server, a second map representing a digital representation of a recommended path for a third optical fiber cord to be arranged in the first trough member or the second fiber trough member located at the telecommunication site without overloading the first trough member or the second fiber trough member.

8. The method according to claim 7, wherein the recommended path for the third optical fiber cord is based at least in part on the relative weights of the optical fiber cords arranged in the first and second fiber trough members located at the telecommunication site.

9. The method according to claim 7, wherein the recommended path for the third optical fiber cord is based at least in part on a run length of the third optical fiber cord.

10. The method according to claim 7, further comprising providing, by the server, a Graphical User Interface (GUI) configured to allow a user to audit the recommended path for the third optical fiber cord to be arranged in the first trough member or the second fiber trough member located at the telecommunication site.

11. A method of managing optical fiber cords in a telecommunication network infrastructure, the method comprising:
receiving, by a server, reported radio signal data from a processor, wherein the reported radio signal data is identified with a piece of telecommunication equipment located at a telecommunication site of the telecommunication network infrastructure, the reported radio signal data indicating that at least a portion of an optical fiber cord is disposed with the piece of telecommunication equipment;
integrating, by the server, the reported radio signal data from the telecommunication site with a digital representation of an arrangement of pieces of the telecommunication equipment located at the telecommunication site; and
generating, by the server, a map of a path of the optical fiber cord relative to the arrangement of pieces of the telecommunication equipment located at the telecommunication site.

12. The method according to claim 11, further comprising providing, by the server, a Graphical User Interface (GUI) configured to allow a user to audit the map of the path of the optical fiber cord.

13. The method according to claim 11, wherein:
the piece of telecommunication equipment is a trough member; and
the portion of the optical fiber cord is arranged in the trough member.

14. The method according to claim 11, wherein:
the piece of telecommunication equipment is a fiber panel; and
the portion of the optical fiber cord is received by the fiber panel.

15. A method of managing optical fiber cords arranged in a telecommunication network infrastructure, the method comprising:
receiving, by a server, reported force signal data from a processor, wherein the reported force signal data is identified with a trough member located at a telecommunication site of the telecommunication network infrastructure, the reported force signal data indicating a force applied, by at least an optical fiber cord of the optical fiber cords, to the trough member;
integrating, by the server, the reported force signal data from the telecommunication site with a digital representation of an arrangement of trough members located at the telecommunication site; and
generating, by the server, a map of a digital representation of relative weights of the optical fiber cords arranged in the trough members located at the telecommunication site.

16. The method according to claim 15, further comprising providing, by the server, a Graphical User Interface (GUI) configured to allow a user to audit the map of the digital representation of relative weights of the optical fiber cords.

17. The method according to claim 15, wherein the map comprises a first map, and
wherein the method further comprises generating, by the server, a second map representing a digital representation of volume percentages of optical fiber cords arranged in the trough members.

18. The method according to claim 15, wherein:
the optical fiber cord comprises a first optical fiber cord;
the map comprises a first map; and
wherein the method further comprises generating, by the server, a second map representing a digital representation of a recommended path for a second optical fiber cord to be arranged in the trough members located at the telecommunication site without overloading the trough members.

19. The method according to claim 18, wherein the recommended path for the second optical fiber cord is based at least in part on the relative weights of the optical fiber cords arranged in the trough members located at the telecommunication site.

20. The method according to claim 18, wherein the recommended path for the second optical fiber cord is based at least in part on a run length of the second optical fiber cord.

* * * * *